(12) United States Patent
Richards et al.

(10) Patent No.: US 9,015,197 B2
(45) Date of Patent: *Apr. 21, 2015

(54) DYNAMIC REPARTITIONING FOR CHANGING A NUMBER OF NODES OR PARTITIONS IN A DISTRIBUTED SEARCH SYSTEM

(75) Inventors: Michael Richards, Berkeley, CA (US); James E. Mace, San Francisco, CA (US)

(73) Assignee: Oracle International Corporation, Redwood Shores, CA (US)

(*) Notice: Subject to any disclaimer, the term of this patent is extended or adjusted under 35 U.S.C. 154(b) by 1134 days.

This patent is subject to a terminal disclaimer.

(21) Appl. No.: 11/832,386

(22) Filed: Aug. 1, 2007

(65) Prior Publication Data
US 2008/0033927 A1 Feb. 7, 2008

Related U.S. Application Data

(60) Provisional application No. 60/821,621, filed on Aug. 7, 2006.

(51) Int. Cl.
*G06F 17/20* (2006.01)
*G06F 17/30* (2006.01)

(52) U.S. Cl.
CPC .................. *G06F 17/30545* (2013.01)

(58) Field of Classification Search
CPC .............. G06F 17/30637; G06F 17/30669; G06F 17/30681
USPC ........... 707/610–639, 784, 999.006; 704/240, 704/251, 254, E15.004, 243, 233, 236, 704/E15.009, E15.023, E15.043, 226, 231, 704/252, 255, 257, E15.008, E15.013, 704/E15.038, E15.046, E21.004, 235, 242, 704/256, 8, 9, E15.014, 10, 250, E13.012, 704/E15.018, E15.02, E15.028, E15.037, 704/E21.007, 244, 246, 249, 256.4, 260, 704/266, 270, E13.009, E15.001, E15.005, 704/E15.007, E15.015, E15.027, E15.031, 704/E15.039, E15.044, E15.045, E19.002, 704/201, 208, 211, 214, 217, 221, 237, 238, 704/239, 241, 245, 256.1, 256.5, 356.7, 704/256.8, 258, 270.01, 273, 275, 278, 704/503; 715/234, 727, 728, 763, 839

See application file for complete search history.

(56) References Cited

U.S. PATENT DOCUMENTS 4,601,012 A 7/1986 Aiken, Jr.
4,620,295 A 10/1986 Aiken, Jr.

(Continued)

OTHER PUBLICATIONS

International Search Report for PCT/US07/75121, dated Jul. 7, 2008, 10 pages.

(Continued)

*Primary Examiner* — Jacob F. Bétit
*Assistant Examiner* — Amanda Willis
(74) *Attorney, Agent, or Firm* — Kilpatrick Townsend & Stockton LLP

(57) ABSTRACT

A distributed search system can include a group of nodes assigned to different partitions. Each partition can store indexes for a group of documents. Nodes in the same partition can independently processing document-based records to construct the indexes. One of the nodes can process a stored checkpoint to produce a repartitioned checkpoint. The group of nodes can respond to search requests during the construction of the repartitioned checkpoint. The repartitioned checkpoint can be loaded into the group of nodes to repartition the group of nodes.

22 Claims, 9 Drawing Sheets

(56) References Cited

U.S. PATENT DOCUMENTS

| | | | |
|---|---|---|---|
| 5,434,994 A * | 7/1995 | Shaheen et al. | 709/223 |
| 6,070,158 A | 5/2000 | Kirsch et al. | |
| 6,101,491 A | 8/2000 | Woods | |
| 6,182,063 B1 | 1/2001 | Woods | |
| 6,415,319 B1 | 7/2002 | Ambroziak | |
| 6,505,191 B1 | 1/2003 | Baclawski | |
| 6,516,337 B1 * | 2/2003 | Tripp et al. | 709/202 |
| 6,625,619 B1 | 9/2003 | McClendon et al. | |
| 6,704,722 B2 | 3/2004 | Baldonado et al. | |
| 6,804,662 B1 | 10/2004 | Annau et al. | |
| 6,957,213 B1 | 10/2005 | Yuret | |
| 7,047,246 B2 | 5/2006 | Brown et al. | |
| 7,171,415 B2 | 1/2007 | Kan et al. | |
| 7,240,064 B2 | 7/2007 | Risvik et al. | |
| 7,251,663 B1 | 7/2007 | Smith | |
| 7,287,033 B2 | 10/2007 | Shadmon et al. | |
| 7,293,016 B1 | 11/2007 | Shakib et al. | |
| 7,330,857 B1 | 2/2008 | Svingen et al. | |
| 7,567,959 B2 | 7/2009 | Patterson | |
| 7,725,470 B2 | 5/2010 | Richards et al. | |
| 2002/0013832 A1 * | 1/2002 | Hubbard | 709/220 |
| 2002/0114341 A1 * | 8/2002 | Sutherland et al. | 370/428 |
| 2003/0154238 A1 * | 8/2003 | Murphy et al. | 709/201 |
| 2003/0204515 A1 | 10/2003 | Shadmon et al. | |
| 2005/0091210 A1 | 4/2005 | Inohara et al. | |
| 2006/0041560 A1 | 2/2006 | Forman et al. | |
| 2006/0069982 A1 | 3/2006 | Petriuc | |
| 2006/0106792 A1 | 5/2006 | Patterson | |
| 2007/0067304 A1 | 3/2007 | Ives | |
| 2008/0021902 A1 | 1/2008 | Dawkins et al. | |
| 2008/0033910 A1 | 2/2008 | Richards et al. | |
| 2008/0033911 A1 | 2/2008 | Raman et al. | |
| 2008/0033925 A1 | 2/2008 | Richards et al. | |
| 2008/0033943 A1 | 2/2008 | Richards et al. | |
| 2008/0033958 A1 | 2/2008 | Richards et al. | |
| 2008/0033964 A1 | 2/2008 | Richards et al. | |

OTHER PUBLICATIONS

Gnawali, Omprakash D., A Keyword-Set Search System for Peer-to-Peer Networks, MIT Master of Engineering Thesis, Cambridge, MA, Jun. 2002, Mar. 23-24, 1999, pp. 1-65.

Li, Yin et al., "Performing Efficient Keyword Search by Keyword Grouping in DHT Peer-to-Peer Network", ISPA Workshops 2005, LNCS 3759, Springer-Verlag, Berlin, Germany, Oct. 25, 2005, pp. 17-26.

Li, Yin et al., "pKSS: An Efficient Keyword Search System in DHT Peer-to-Peer Network", ICA3PP 2005, LNCS 3719, Springer-Verlag, Berlin, Germany, Oct. 13, 2005, pp. 112-117.

Orlando, S. et al., "Design of a Parallel and Distributed Web Search Engine", ParCo 2001, copyright 2001, pp. 197-204.

Reynolds, Patrick et al., "Efficient Peer-to-Peer Keyword Searching", Proc. of the ACM/IFIP/USENIX 2003 Conf. on Middleware, Rio de Janeiro, Brazil, Jun. 16-20, 2003, pp. 21-40.

Silvestri, Fabrizio et al., "Wings: A Parallel Indexer for Web Contents", ICCS 2004, LNCS 3036, Springer-Verlag, Berlin, Germany, May 13, 2004, pp. 263-270.

U.S. Appl. No. 11/832,352, filed Aug. 1, 2007, Office Action mailed Jun. 17, 2008, 15 pgs.

U.S. Appl. No. 11/832,352, filed Aug. 1, 2007, Final Office Action mailed Nov. 13, 2008, 16 pgs.

U.S. Appl. No. 11/832,352, filed Aug. 1, 2007, Office Action mailed Oct. 15, 2009, 20 pgs.

U.S. Appl. No. 11/832,381, filed Aug. 1, 2007, Office Action mailed Aug. 14, 2009, 11 pgs.

U.S. Appl. No. 11/832,370, filed Aug. 1, 2007, Office Action mailed Aug. 14, 2009, 8 pgs.

U.S. Appl. No. 11/832,375, filed Aug. 1, 2007, Office Action mailed Aug. 20, 2009, 14 pgs.

U.S. Appl. No. 11/832,389, filed Aug. 1, 2007, Office Action mailed Aug. 17, 2009, 12 pgs.

U.S. Appl. No. 11/832,363, filed Aug. 1, 2007, Office Action mailed Aug. 20, 2009, 9 pgs.

U.S. Appl. No. 11/832,363, filed Aug. 1, 2007, Notice of Allowance mailed Jan. 29, 2010, 9 pgs.

* cited by examiner

DYNAMIC REPARTITIONING FOR CHANGING A NUMBER OF NODES OR PARTITIONS IN A DISTRIBUTED SEARCH SYSTEM

CLAIM OF PRIORITY

This application claims priority from the following co-pending applications, which are hereby incorporated in their entirety:

U.S. Provisional Application No. 60/821,621 entitled SEARCH SYSTEM, by Michael Richards et al., filed Aug. 7, 2006.

CROSS-REFERENCE TO RELATED APPLICATIONS

This application is related to the following co-pending applications:

U.S. patent application Ser. No. 11/832,352, entitled DISTRIBUTED INDEX SEARCH, filed Aug. 1, 2007, by Michael Richards et al.

U.S. patent application Ser. No. 11/832,363, entitled DISTRIBUTED QUERY SEARCH, filed Aug. 1, 2007, by Michael Richards et al.

U.S. patent application Ser. No. 11/832,370, entitled DISTRIBUTED SEARCH ANALYSIS, filed Aug. 1, 2007 by Michael Richards et al.

U.S. patent application Ser. No. 11/832,375, entitled DYNAMIC CHECKPOINTING FOR DISTRIBUTED SEARCH, filed Aug. 1, 2007, by Michael Richards et al.

U.S. patent application Ser. No. 11/832,381, entitled FAILURE RECOVERY FOR DISTRIBUTED SEARCH, filed Aug. 1, 2007, by Michael Richards et al.

U.S. patent application Ser. No. 11/832,389, entitled DISTRIBUTED SEARCH SYSTEM WITH SECURITY, filed Aug. 1, 2007, by Michael Richards et al.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

As enterprises get larger and larger, more and more documents are put into enterprise portal and other systems. One way to keep these documents searchable is to provide for a enterprise wide distributed search system.

DETAILED DESCRIPTION

Figure 1:
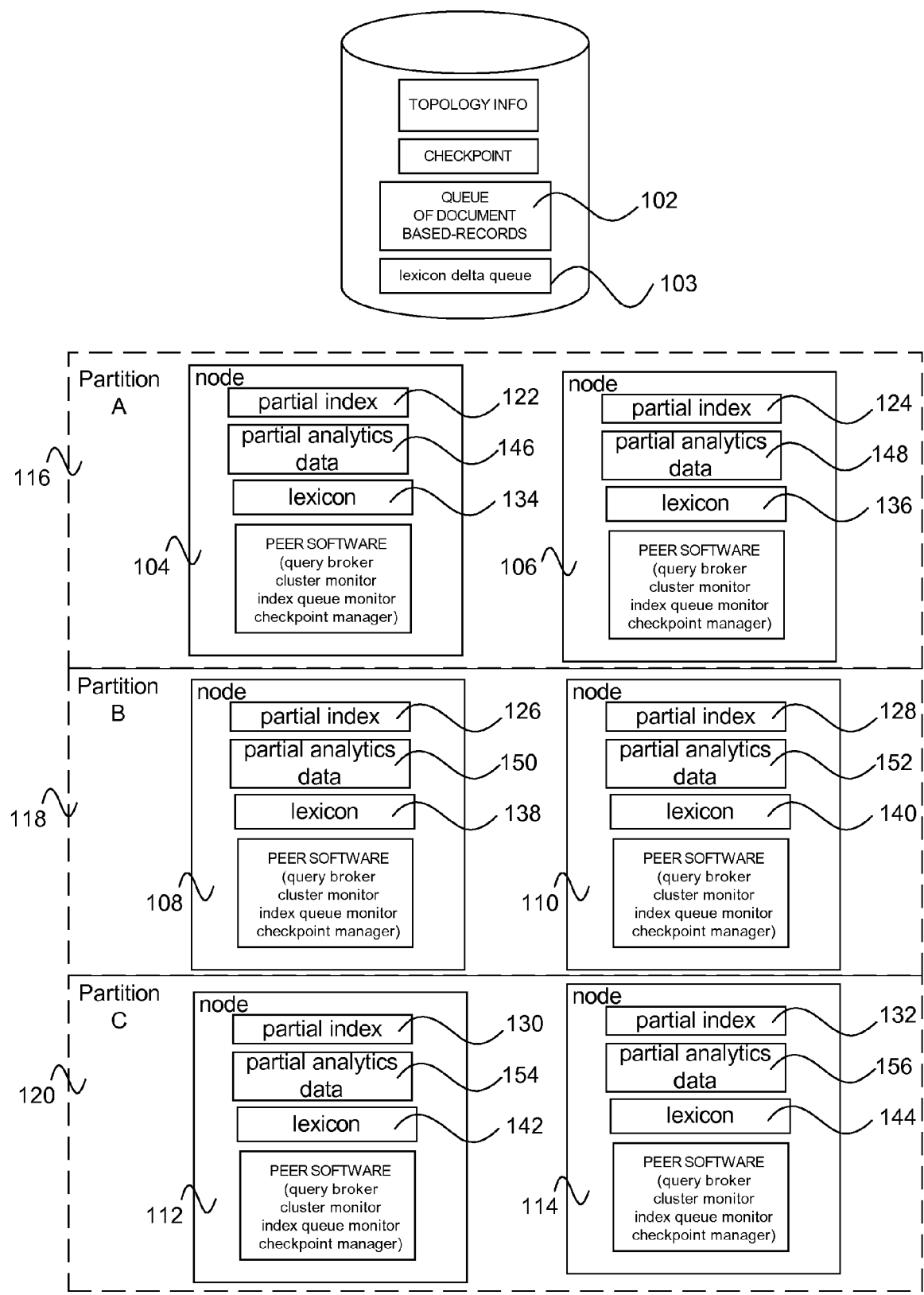
FIG. 1 shows an exemplary distributed search system of one embodiment of the present invention.

Embodiments of the present invention concern ways to scale the operation of an enterprise search system. This can include using multiple partitions to handle different sets of documents and providing multiple nodes in each partition to redundantly search the set of documents of a partition.

One embodiment of the present invention is a distributed search system comprising a central queue 102 of document-based records and a group of nodes 104, 106, 108, 110, 112 and 114 assigned to different partitions 116, 118 and 120. Each partition can store indexes 122, 124, 126, 128, 130 and 132 for a group of documents. Nodes 104 and 106 in the same partition 116 can independently process the document-based records off of the central queue to construct the indexes 122 and 124.

The nodes can maintain a synchronized lexicon so that aggregated query results can be decoded no matter which partition the results came from. The nodes can independently maintain their (partial) index data by reading from the central queue.

The indexes can indicate what terms are associated with which documents. An exemplary index can include information that allows the system to determine what terms are stored in which documents. In one embodiment, different partitions store information concerning different sets of documents. In one embodiment, multiple modes in the same partition work independently to process user request for a specific set of documents.

In one embodiment, each node can receive documents to create document-based records for the central queue. The nodes 104, 106, 108, 110, 112 and 114 can include a lexicon 134, 136, 138, 140, 142 and 144. The nodes can also include partial document content and metadata 146, 148, 150, 152, 154 and 156. The nodes data can store data for the set of the documents associated with the partition containing the node.

The document-based records can include document keys, such as Document IDs. The document keys can be hashed to determine the partition whose index is updated. The indexing can include indicating what documents are associated with potential search terms. Searches can include combining results from multiple partitions. The documents can include portal objects with links that allow for the construction of portal pages. The documents can also include text documents, web pages, discussion threads, other files with text, and/or database entries.

The nodes can be separate machines. In one embodiment, nodes in each partition can independently process the document-based records off of the queue 102. The document-based records can include document "adds" that the nodes use to update the index and analytics data for a partition. The document-based record can be a document "delete" that cause the nodes to remove data for a previous document-based record from the index and remove associated document metadata. The document-based record can be a document "edit" that replaces the index data and document metadata for a document with updated information.

In one embodiment, the nodes 104, 106, 108, 110, 112 and 114 run peer software. The peer software can include functions such as a Query Broker to receive requests from a user, select nodes in other partitions, send the requests to those nodes, combine partial results, and send combined results to the user. The Query Broker can implement search requests such that the partial results only indicate documents that the user is allowed to access. Each node can act as the Query Broker for different requests.

The peer software can also include a Cluster Monitor that allows each node to determine the availability of other nodes to be part of searches and other functions. An Index Queue Monitor can get document-based records off of the queue 102.

In one embodiment, a document ID can be used to map a document-based record to a partition. Each node in the partition can process the document-based record based on the document ID. For example, a function such as:

HASH (Document ID) mod (# of partitions)

can be used to select a portion for a document. Any type of HASH function can be done. The HASH function can ensure that the distribution of documents between partitions is relatively equal.

In one embodiment, each document is sent to one of the nodes. The document can be processed by turning words into tokens. Plurals and different tense forms of a word can use the same token. The token can be associated with a number. The token/number relationships can be stored in lexicon, such as lexicons 124, 136, 138, 140, 142 and 144. In one embodiment, new tokens can have their token/number relationships stored in the lexicon delta queue 103. The nodes can get new token/number pairs off of the lexicon delta queues to update their lexicons.

The indexes can have numbers which are associated with lists of document IDs. The lists can be returned to produce a combined result. For example, a search on:

Green AND Car, could find multiple documents from each partition. A combined list can then be provided to the user. This combined list can be sorted according to relevance. Using document-based partitioning allows for complex search processing to be done on each node and for results to be easily combined.

The documents can be portal objects containing field-based data, such as XML. Different fields in the portal object can be stored in the index in a structured manner. The portal objects can include or be associated with text such as Word™ document or the like. The portal objects can have a URL links that allows the dynamic construction of a portal page. The URL can be provided to a user as part of the results.

Figure 2:
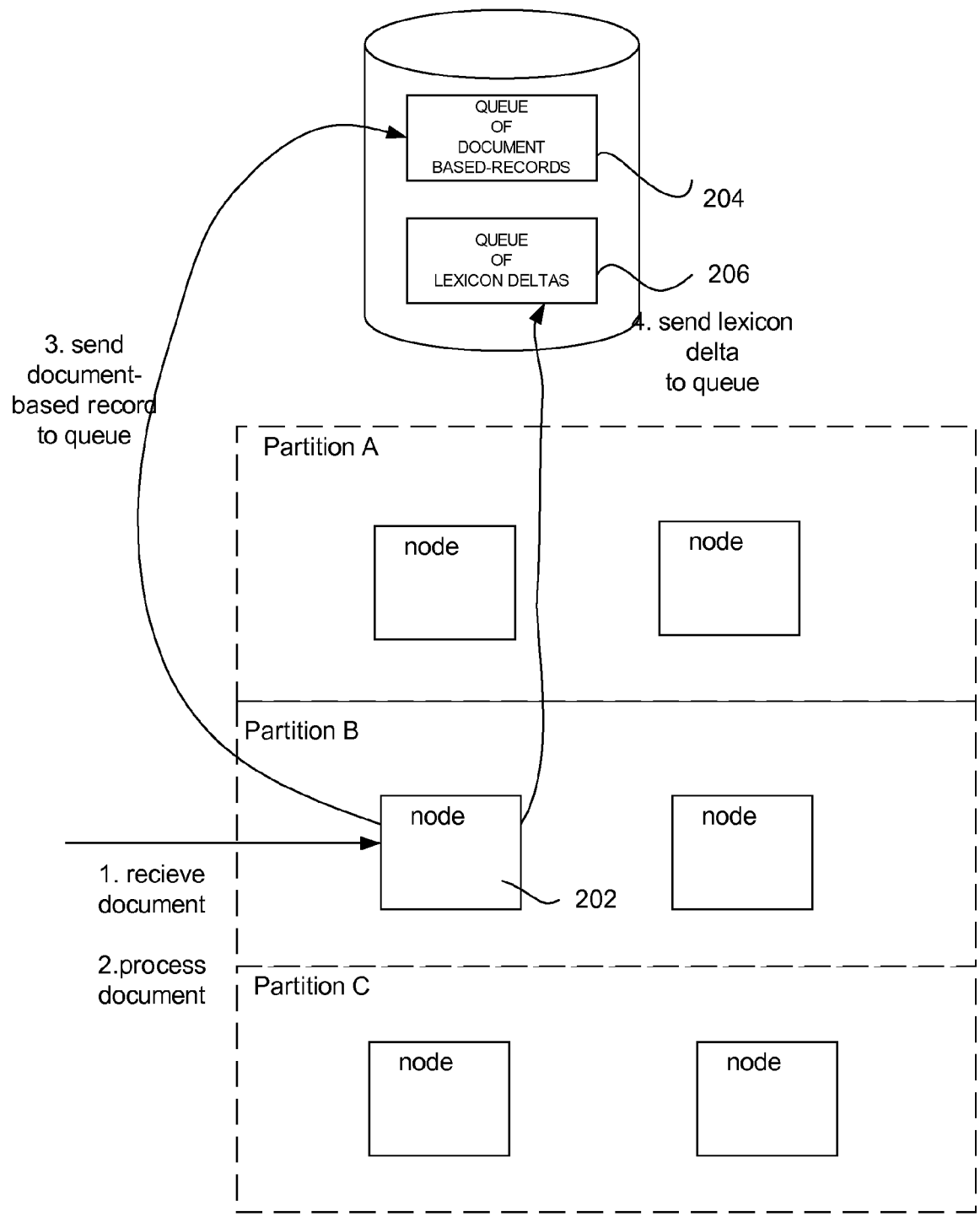
FIG. 2 shows the processing of documents into document-based records which can be put onto a central queue in one embodiment of the present invention.

FIG. 2 shows an example wherein a node, such as node 202, receives a document. In this example, the document is processed to produce a document-based record that is put on queue 204. A lexicon delta for queue 206 can be created if any new token is used.

Figure 3:
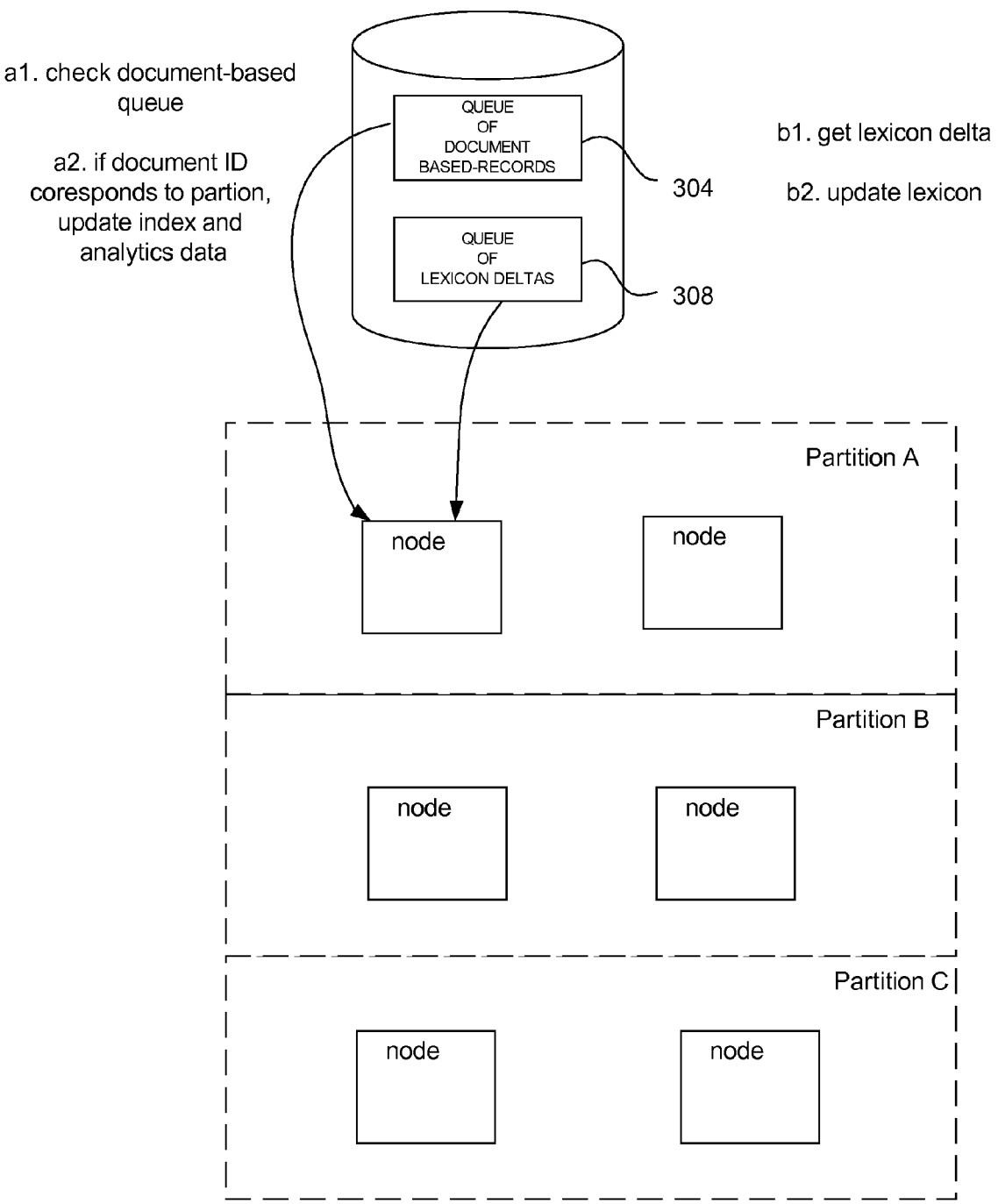
FIG. 3 shows the processing of a document-based record by one of the nodes of the system in one embodiment of the present invention.

FIG. 3 shows an example where a node 302 checks the queue 304 for documents. If the document ID corresponds to partition A, the node 302 gets the document-based record and updates the index and the document metadata. Other nodes in partition A, such as node 306, can independently process the document-based record. The nodes in the same partition need not synchronously process the document-based records. Node 302 can also get lexicon deltas off of the lexicon delta queue 308 to update that node's lexicon.

One embodiment of the present invention is a computer readable medium containing code to access a central queue of document-based records and maintain an index for a portion of the documents of the distributed search system as indicated by a document ID associated with the document-based records.

One embodiment of the present invention is a distributed search system comprising a group of nodes assigned to different partitions. Each partition can store a partial index for a group of documents. At least one of the nodes 402 can receive a search request from a user, send the request to a set of nodes 404 and 406, receive partial results from the set of nodes 404 and 406 and create a combined result from the partial results. The combined result can include results from a node in each partition. The partial results can be sorted by relevance to create the combined result.

In one embodiment, a computer readable medium contains code to send query requests to a set of nodes 404 and 406. Each of the set of nodes can be in a different partition. Each partition can store indexes for a group of documents. The node can receive partial results from the set of nodes 404 and 406 and create a combined result from the partial results.

Figure 4:
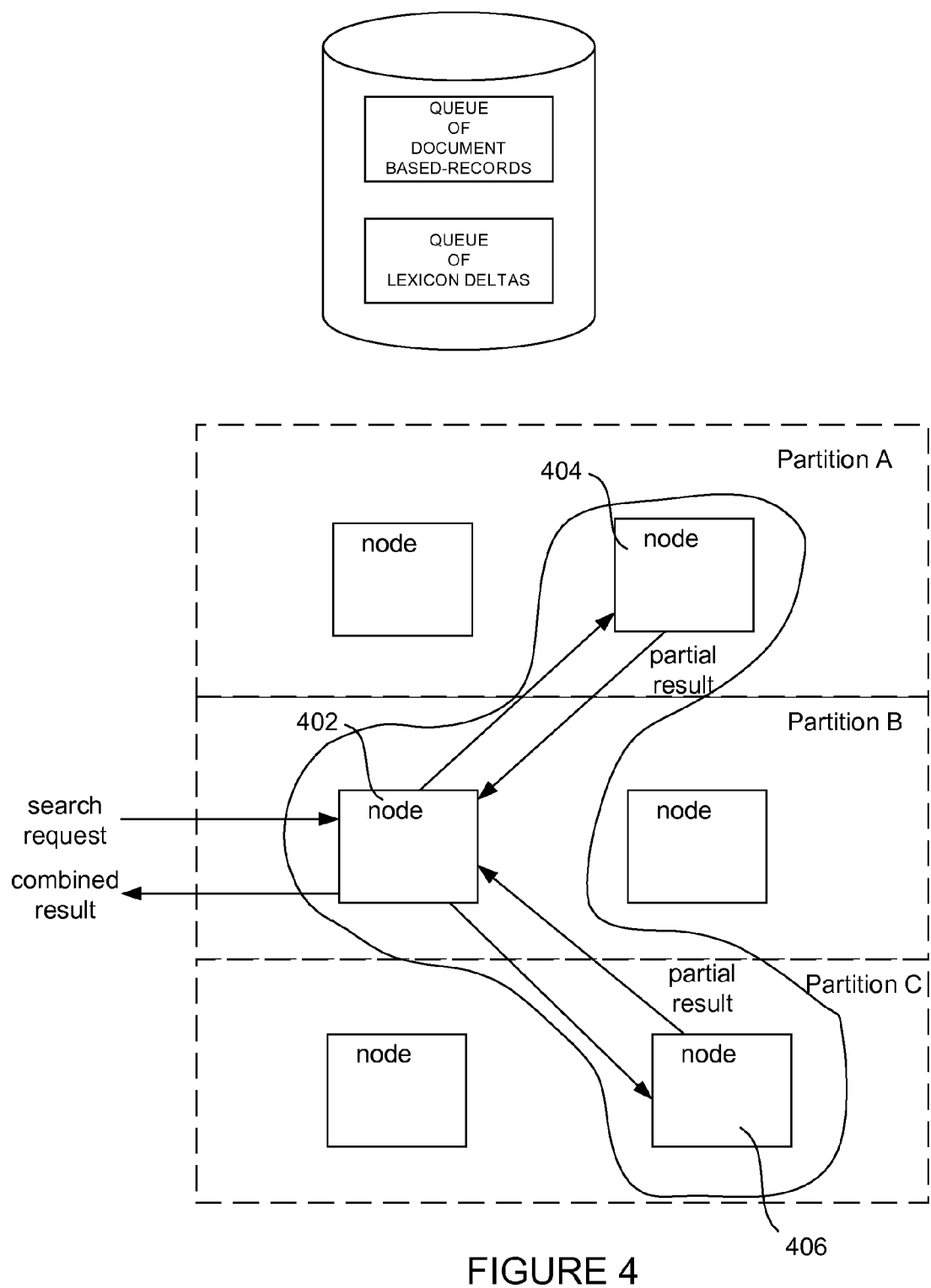
FIG. 4 shows a distributed search request of one embodiment of the present invention.

In the example of FIG. 4, the set of nodes includes nodes 402, 404 and 406. Node 402 can select the other nodes for the set of nodes in a round-robin or other fashion. The next query will typically use a different set of nodes. This distributes the queries around the different nodes in the partitions.

One embodiment of the present invention is a distributed search system comprising a set of nodes assigned to different partitions. Each partition can store document content and metadata for a group of documents. At least one of the nodes 502 can receive an analytics request from a user, send the request to a set of nodes 504 and 506, receive partial analytics results from the set of nodes 504 and 506 and create a combined analytics result from the partial analytics results. The combined analytics result can include partial analytics results from a node in each partition.

One embodiment of the present invention is a computer implemented method comprising sending an analytics request to a set of nodes 504 and 506. Each of the nodes can be in a different partition. Each partition can store partial analytics data for a group of documents, receive partial analytics results from the set of nodes 504 and 506, and create a combined analytics result from the partial results. The combined analytics results can include analytics results from a node in each partition.

The results can contain document text, search hit contexts, or analytic data as well as document keys. Results can be ranked by a variety of relevance or sorting criteria or a combination of criteria. Any node can act as a query broker, issuing distributed queries, combining partial results, and returning a response to the client. Results can be decoded to text on any node by the use of a synchronized lexicon.

Figure 5:
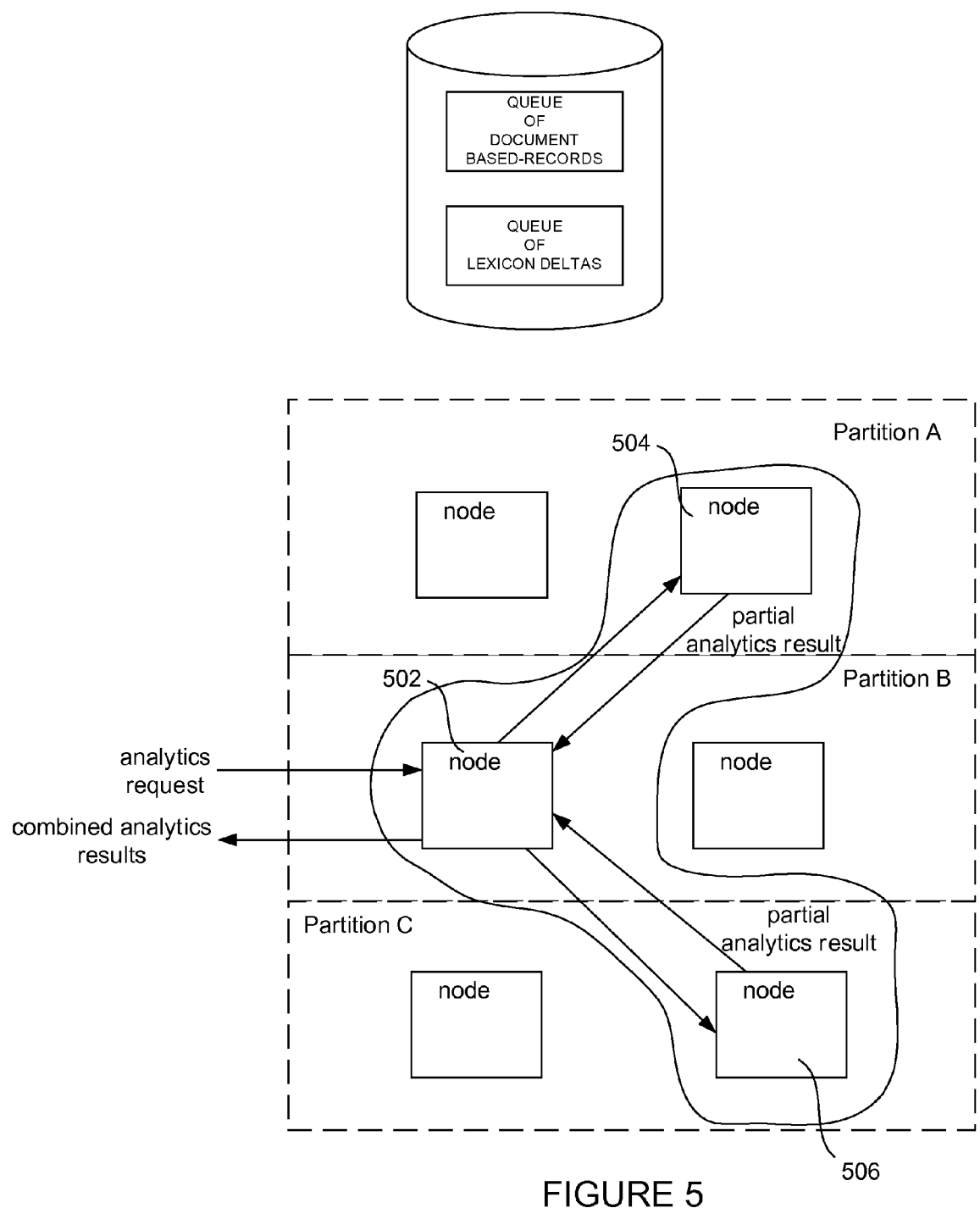
FIG. 5 shows a distributed analytics request of one embodiment of the present invention.

FIG. 5 shows a situation where the nodes store partial analytics data, such as the analytics data described in U.S. Pat. No. 6,804,662, incorporated herein by reference. The analytics data can concern portal and portlet usage document location or other information. Different nodes can be part of the set of nodes for different analytics requests.

One embodiment of the present invention is a computer readable medium containing code to send an analytics request to a set of nodes 504 and 506. Each of the nodes can be in a different partition. Each partition can store document data for a group of documents; receive partial analytics results from the set of nodes 504 and 506; and create a combined analytics result from the partial results. The combined analytics results can include analytics results from a node in each partition.

The analytics results can concern document text and metadata stored at a node. The analytics results can be created as needed for an analytics query.

Figure 6:
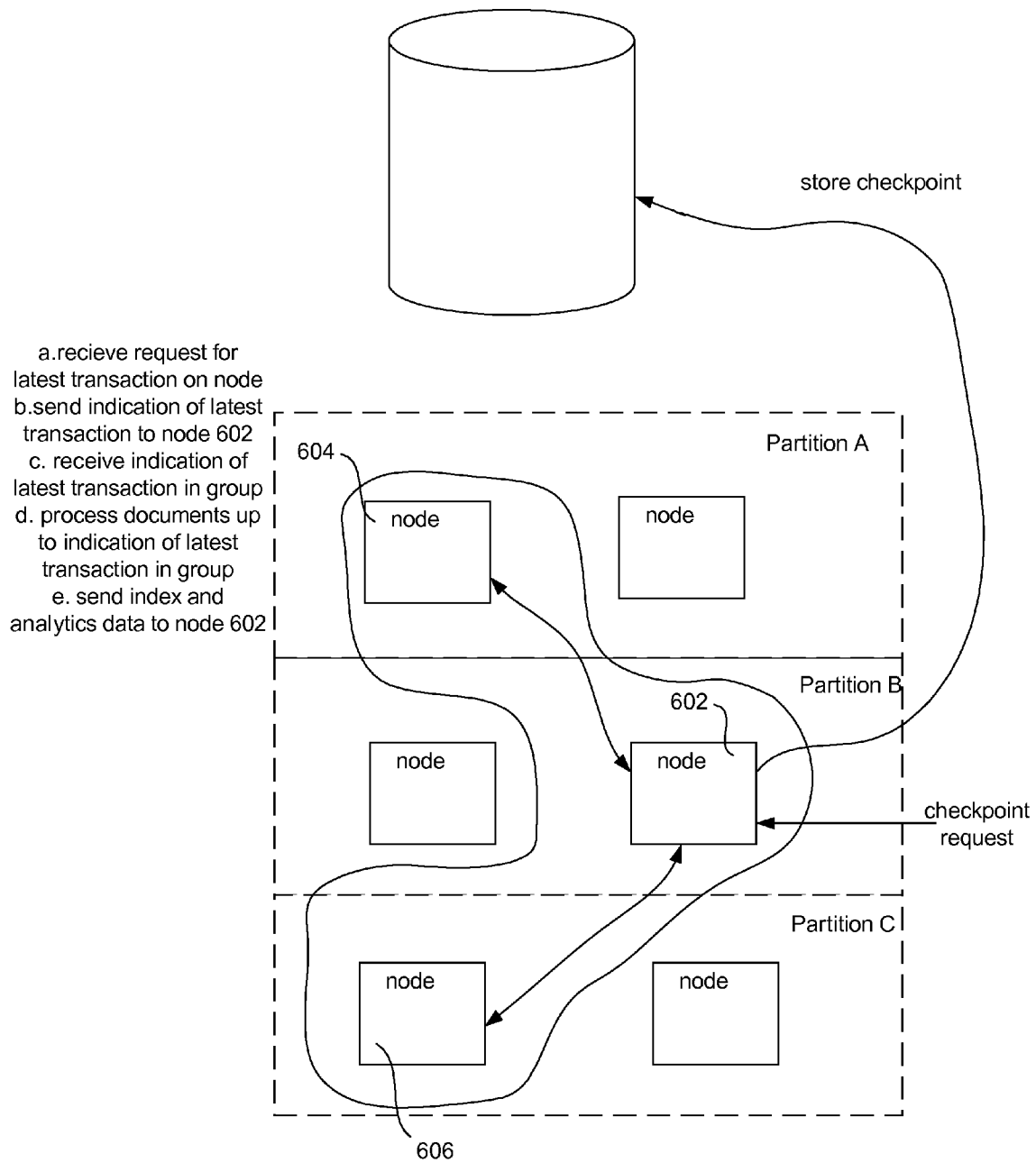
FIG. 6 shows checkpoint construction in one embodiment of the present invention.

FIG. 6 shows an example of a method to create a checkpoint. In this example, nodes 602, 604 and 606 are used to create a checkpoint. The checkpoint allows a previous state to be loaded in case of a failure. It also allows old document-based records and index deltas to be removed from the system.

At least one node in each partition must be used to create a checkpoint. These nodes can be selected when the checkpoint is created. The checkpoint can contain index and document data that is stored in the nodes.

In one embodiment, the nodes process document-based records and lexicon deltas up to the latest transaction of the most current node in the group of nodes. When all of the nodes have reached this latest transaction, the data for the checkpoint can be collected.

One embodiment of the present invention is a distributed search system comprising a group of nodes assigned to different partitions. Each partition can store indexes for a group of documents. Nodes in the same partition can independently process document-based records to construct the indexes. A set of nodes 602, 604 and 606 can be used to create a checkpoint 608 for the indexes. The set of nodes 602, 604 and 606 can include a node in each partition.

The nodes can process search requests concurrently with the checkpoint creation.

The checkpoint 608 can include the partial data used to create the partial analytics data from the different nodes. The checkpoint can be used to reload the state of the system upon a failure. Checkpoints can be created on a regular schedule. The checkpoint can be stored at a central location. The group of nodes can respond to search requests during the construction of a checkpoint 608.

The creation of the checkpoint can include determining the most recent transaction used in an index of a node of the set of nodes; instructing the set of nodes to update the indexes up to the most recent transaction; transferring the indexes from the set of nodes to the node that sends the data; and transferring the data as a checkpoint 608 to a storage location.

Figure 7:
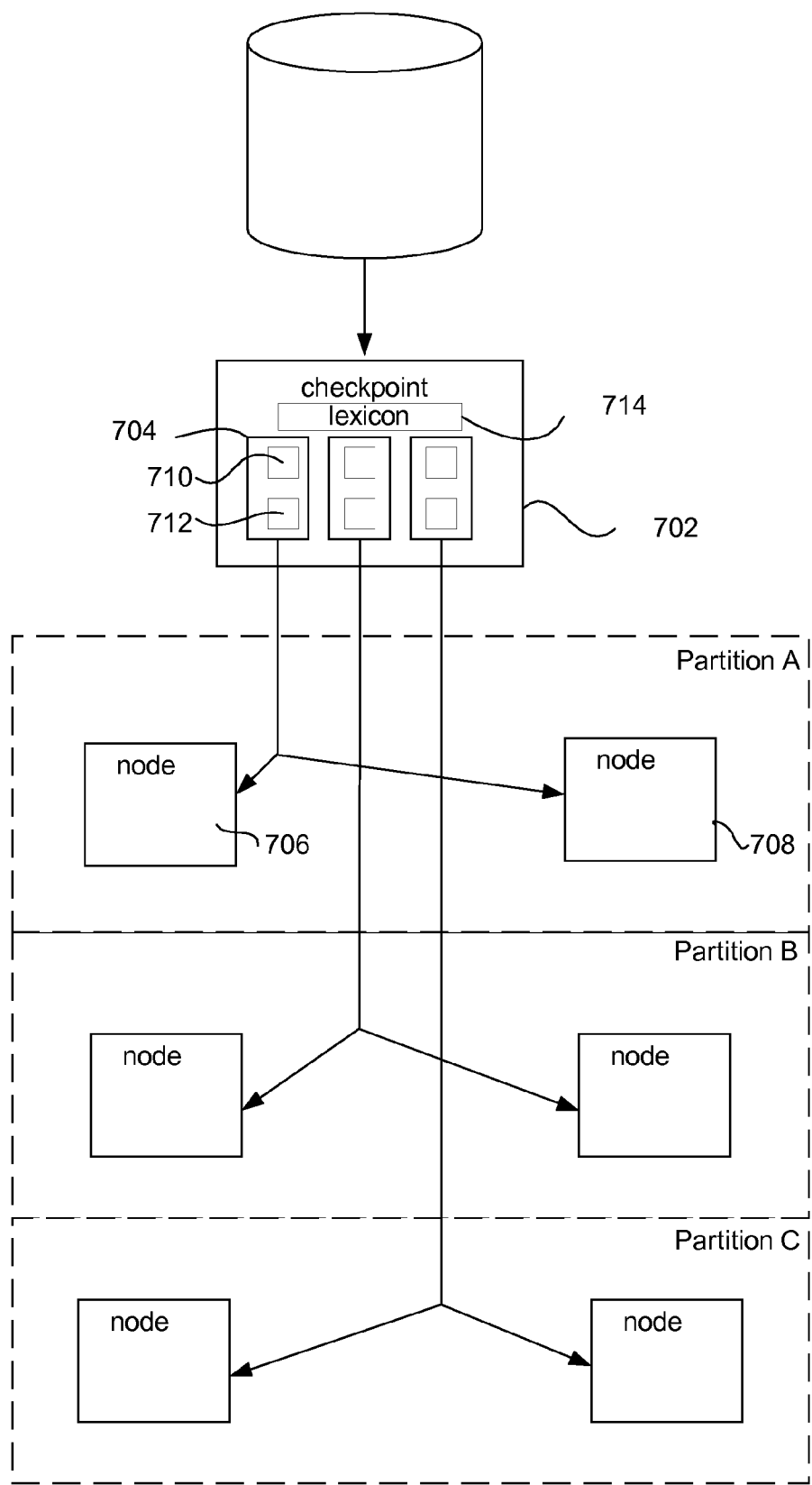
FIG. 7 shows checkpoint loading in one embodiment of the present invention.

FIG. 7 shows an example of a case where a checkpoint 702 is loaded into the nodes of the different partitions. In this example, the checkpoint 702 includes data 706 for nodes 706 and 708. The data 704 can include a partial index 710 and partial analytic data 712. Lexicon 714 can also be loaded as part of a checkpoint.

One embodiment of the present invention is a distributed search system comprising a group of nodes assigned to different partitions. Each partition can store indexes for a group of documents. Nodes in the same partition can independently process document-based records to construct the indexes. In case of a failure, a checkpoint can be loaded into a set of nodes including a node in each partition. The checkpoint can contain the indexes, extracted document text and metadata.

The nodes can store partial data which can then be stored in the checkpoint. The checkpoints can be created on a regular schedule. Checkpoints can be stored at a central location. The central location can also contain a central queue of document-based records.

When a new, empty failover node is added to an existing partition, or when an existing node is replaced by an empty node due to hardware failure, the new node can compare its state to the state of the rest of the cluster and if it is behind the most recent transaction, it can locate the most recent checkpoint, restore itself from the most recent checkpoint, and play forward through transactions in the request queue that are subsequent to the most recent checkpoint, until it has caught up.

One embodiment of the present invention is a computer readable medium including code to, in case of failure; initiate the loading of a checkpoint to a set of nodes each node containing an index for a group of documents for a partition. The checkpoint can replace the indexes at the nodes with a checkpoint version of the indexes.

Figure 8:
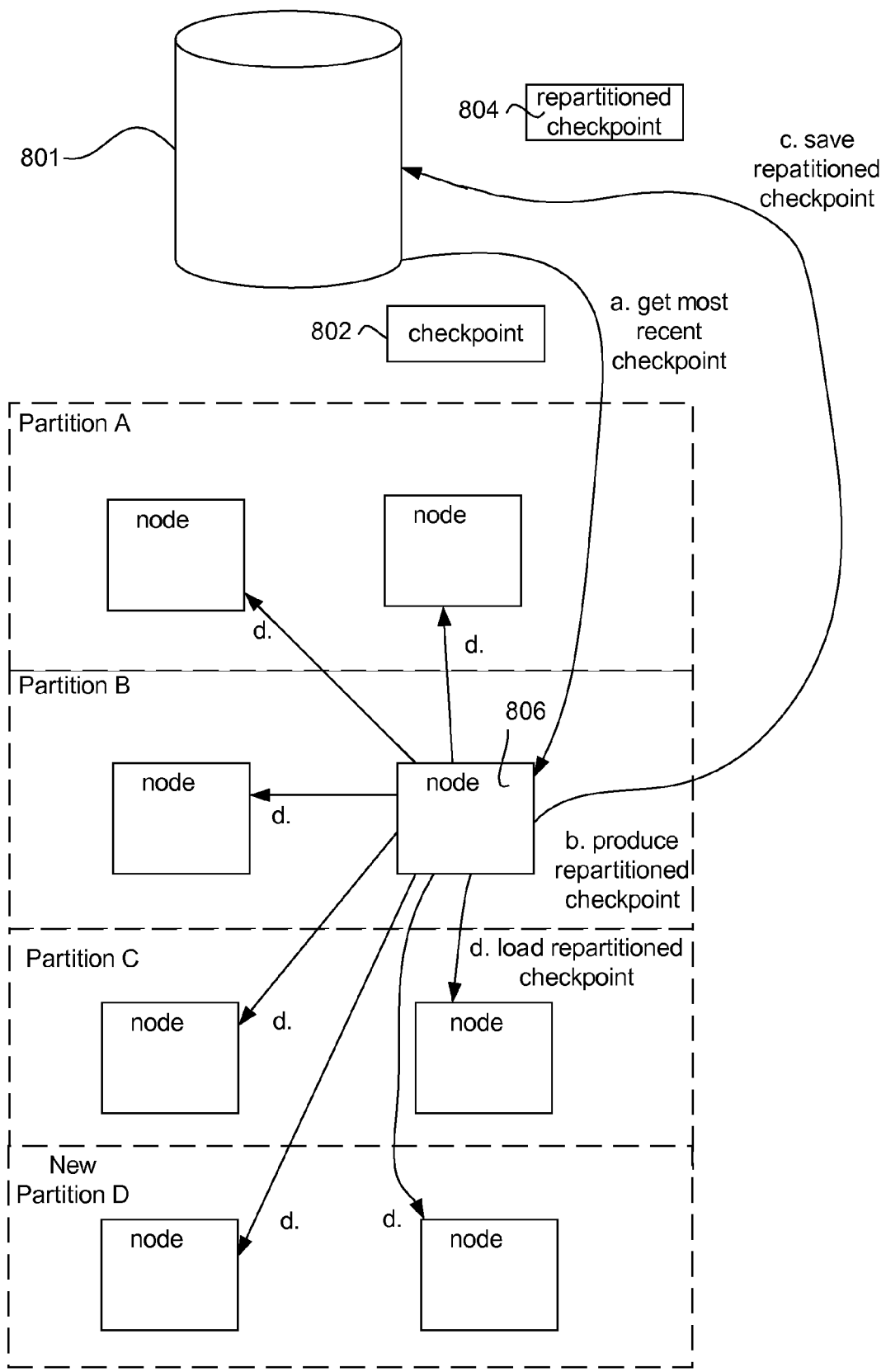
FIG. 8 shows an example of repartitioning using a checkpoint of one embodiment of the present invention.

FIG. 8 shows an example of a repartition. In one example, before a repartition, a new checkpoint is done and stored in the central storage location 801. A node, such as node 806, can obtain a checkpoint 802 from the central storage location 801. The checkpoint can be analyzed to produce a repartitioned checkpoint. For example, the document IDs can be used to construct the repartitioned checkpoint. A new function such as:

HASH (Document ID) mod (New # of partitions), can be used to get the new partition for each Token number/Document ID pair in the Indexes to build new partial indexes. The document ID data of the analytics data can also be similarly processed. The repartitioned checkpoint can be stored into the central storage location 801 then loaded into the nodes.

One embodiment of the present invention is a distributed search system including a group of nodes assigned to different partitions. Each partition can store indexes for a subset of documents. Nodes in the same partition can independently process document-based records to construct the indexes. One of the nodes can process a stored checkpoint 802 to produce a repartitioned checkpoint 804. The group of nodes can respond to search and index update requests during the construction of the repartitioned checkpoint 804. The repartitioned checkpoint 804 can be loaded into the group of nodes to repartition the group of nodes.

The repartition can change the number of partitions and/or change the number of nodes in at least one partition. The construction of the repartitioned checkpoint can be done using a fresh checkpoint created when the repartition is to be done. The repartitioned checkpoint can be stored to back up the system. The topology information can be updated when the repartitioned checkpoint is loaded. The repartitioned checkpoint can also include document content and metadata for the nodes of the different partitions. The nodes can include document data that is updated with the repartitioned checkpoint.

Figure 9:
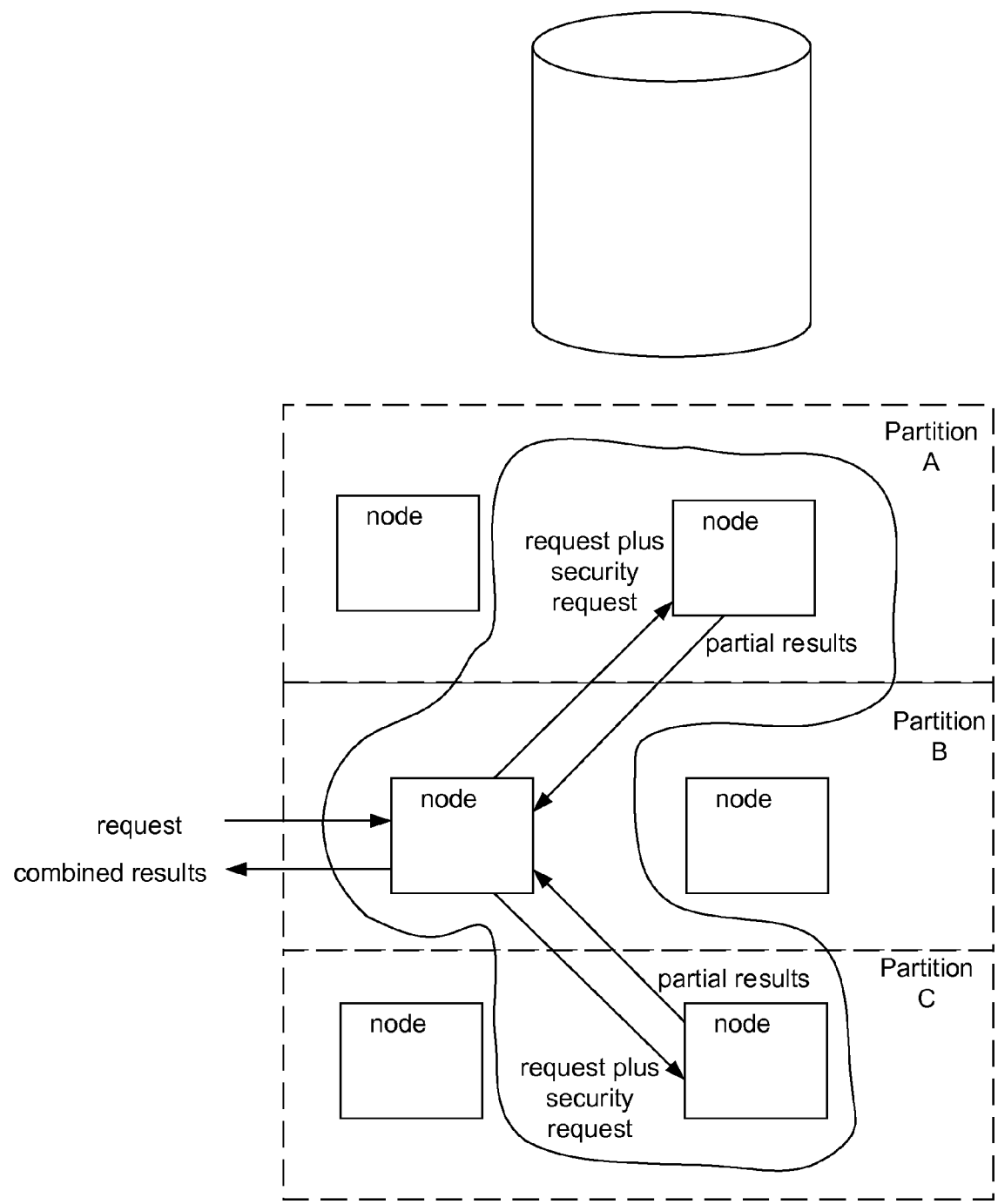
FIG. 9 shows an example of a security request of one embodiment of the present invention.

FIG. 9 shows an example of a security based system. The document can have associated security information such as an access control list (ACL). One XML field for a page can be an access control list. This ACL or other security information can be used to limit the search. In one embodiment, the modified request is an intersection of the original request with a security request. For example, the search:

Green AND Car can be automatically converted to (GREEN AND CAR) AND ACL/MIKEP.

Each node can ensure that the document list sent to the node 900 only includes documents accessible by "MIKEP". In one embodiment, this can mean that multiple tokens/numbers, such as "MIKEP", "Group 5", "public" in the ACL field are searched for. Using filters for security at each node can have the advantage that it simplifies transfer from the nodes and the processing of the partial search results.

One embodiment of the present invention is a distributed search system including a group of nodes assigned to different partitions. Each partition can store indexes and document data for a group of documents. Nodes in the same partition can independently process document-based records to construct the indexes. The document-based records can include security information for the document. At least one of the nodes can receive a search request from a user, send a modified request to a set of nodes, receive partial results from the set of nodes and create a combined result from the partial results. The set of nodes can include a node in each partition. The modified request can include a check of the security information to ensure that the user is allowed to access each document such that the partial results and combined results only include documents that the user is allowed to access.

Details of one exemplary non-limiting embodiment.

A Search Server can become a performance bottleneck for a large portal installation. Distributed search can be needed both for portal installations, and to support search-dependent layered applications in a scalable manner.

In addition to dynamic indexing, the Search Server can offer a number of other differentiating advanced search features that can be preserved. These include Unicode text representation
On-the-fly results analysis (rollup, cluster, partition)
User-customizable thesaurus
Full text archiving and retrieval
Keyword-in-context result "snippets"
Spell correction and wildcard searching
Weighted field aliases
Weighted search clauses and support for a variety of scoring metrics
Backup and replication capabilities
Self-maintenance and self-repair The search network can be able to scale in two different dimensions. As the search collection becomes larger, the collection can be partitioned into smaller pieces to facilitate efficient access to the data on commodity hardware (limited amounts of CPU, disk and address space). As the search network becomes more heavily utilized, replicas of the existing partitions can be used to distribute the load.

Adding a replica to the search network can be as simple as configuring the node with the necessary information (partition number and peer addresses) and activating it. Once it associates with the network, the reconciliation process can see that it is populated with the current data before being put into rotation to service requests.

Repartitioning the search collection can be a major administrative operation that is highly resource intensive. A naive approach could involve iterating over the documents of the existing collection and adding them to a new network with a different topology. This is expensive in terms of the amount of indexing and amount of hardware required. Better would be to transfer documents from nodes of the current search network to the new node or nodes intended to contain the additional partitions and deleting them from their previous home partitions. Ideally, it would be possible to transfer index triplets and compressed document data directly.

A shared file system can store system checkpoints to simplify this operation, since it puts all documents in a single location and facilitates batch processing without interfering with search network activity. Repartitioning can be performed on an off-line checkpoint image of the system, without having to take the cluster off line.

The ability to support an arbitrarily large number of search partitions means that large collections can be chunked into amounts suitable for commodity hardware. However, the overhead associated with distributing and aggregating results for many nodes may eventually become prohibitive. For enormous search collections, more powerful hardware (64-bit Unix servers) can be employed as search nodes.

The resource requirements of the current system design could limit the number of nodes supported in a cluster. For an exemplary system, 16-node cluster of 8 mirrored partitions can be used.

The search network architecture described here uses distributed data storage by design. Fast local disks (especially RAID arrays) on each node can ensure optimal performance for query processing and indexing. While each search node can maintain a local copy of its portion of the search collection, the copy of the data on the shared file system represents the canonical system state and can be hardened to the extent possible.

Replica nodes and automatic reconciliation in the search network can provide both high availability and fault tolerance for the system. The query broker can be able to tolerate conditions where a node is off-line or extremely slow in responding. In such a case, the query broker can return an incomplete result, with an XML annotation indicating it as such, in a reasonable amount of time. In one embodiment, internal query failover (where the broker node would retry to complete a result set) is not a requirement. The system can automatically detect unresponsive nodes and remove them from the query pool until they become responsive again.

Automatic checkpointing can provide regular consistent snapshots of all cluster data which can be archived by the customer and used to restore the system to a previous state. Checkpoints can also be used for automatic recovery of individual nodes. For instance, if a new peer note is brought online with an empty index, it can restore its data from the most recent checkpoint, plus the contents of the indexing transaction log.

Search logs can be less verbose, and error messages can be more visible. Support for debugging and monitoring can be separated from usage and error logging. It can be possible to monitor and record certain classes of search network activity and errors from a central location.

The cluster topology can have two dimensions, the number of partitions and the number of mirrored nodes in each partition. The physical topology, including the names and addresses of specific hosts, can be maintained in a central file. Each node can read this configuration at startup time and rebuild its local collection automatically if its partition has changed relative to the current local collection.

A Checkpoint Manager can periodically initiate a checkpoint operation by selecting a transaction ID that has been incorporated into all nodes of the cluster. Internally consistent binary data can then be transferred to reliable storage from a representative node in each cluster partition. Once the copy is complete and has been validated, transaction history through up to and including the transaction ID associated with the checkpoint can be purged from the system.

A configurable number of old checkpoints can be maintained by the system. In one embodiment, the only checkpoint from which lossless recovery will be possible is the "last known good" copy. Older checkpoints can be used for disaster recovery or other purposes. Since checkpoint data can be of significant size, in most cases only the last known good checkpoint will be retained.

When initializing a new cluster node, or recovering from a catastrophic node failure, the last known good checkpoint will provide the initial index data for the node's partition and any transaction data added since the checkpoint was written can be replayed to bring the node up to date with the rest of the cluster.

Search servers can always start up in standby mode (alive but not servicing requests). When starting up with an empty search collection and a null or missing local transaction log file, the search server can look for a last-known-good checkpoint in the cluster's shared data repository. If a checkpoint exists, the search server can obtain a checkpoint lock on the cluster and proceed to copy the checkpoint's mappings collection, lexicon, and partition archive collection to the proper locations on local disk, replacing any existing local files. It can then release the checkpoint lock and transition to write-only mode and proceed to read any index queue files present in the shared data repository and incorporate the specified delta files. Once the node is sufficiently close to the end of the index queue, it can transition to read-write mode and become available for query processing.

Search servers can always start up in standby mode. When starting up with existing data, the search server can compare the transaction ID read from the local transaction log file with the current cluster transaction ID (available through the Configuration Manager). If it is too far behind the rest of the cluster, the node can compare its transaction ID with that of the last-known-good checkpoint.

If the transaction ID predates the checkpoint, the node can load the checkpoint data before replaying the index queues. The node can obtain a checkpoint lock on the cluster and proceed to copy the checkpoint's mappings collection, lexicon, and partition archive collection to the proper locations on local disk, replacing any existing local files. The node can then release the checkpoint lock, and finish starting up using the logic presented in the next paragraph.

If the transaction ID is at or past the transaction ID associated with the checkpoint, It can then transition to write-only mode and proceed to read any index queue files present in the shared data repository and incorporate the specified delta files. Once the node is sufficiently close to the end of the index queue, it can transition to read-write mode and become available for query processing.

Recovery from catastrophic failure can be equivalent to one of the two cases above, depending upon whether the search server needed to be reinstalled.

Adding a peer node (a node hosting an additional copy of an existing partition) can be equivalent starting a cluster node with an empty local collection.

Checkpoints can be created on an internally or externally managed schedule. Internal scheduling can be configured through the cluster initialization file, and can support cron-style schedule definition, which gives the ability to schedule a recurring task at a specific time on a daily or weekly basis. Supporting multiple values for minute, hour, day, etc. can also be done.

For customers who wish to schedule checkpoint creation using an external tool they can be able to do so using the command line admin tool. For this use case, we can allow the internal schedule to be disabled (i.e. by leaving the checkpoint schedule empty in the cluster configuration file).

System checkpoints can be managed by a checkpoint coordinator. A checkpoint coordinator can be determined by an election protocol between all the nodes in the system. Simultaneous checkpoint operations need not be allowed, so the system can enforce serialization of checkpoint operations through the election protocol and file locking.

One node from each partition can be chosen to participate in the checkpoint. If all nodes report ready, then the coordinator can cause the Index Manager to increment the checkpoint ID and start a new index queue file. The first transaction ID associated with the new file can become the transaction ID of the checkpoint. The coordinator node can then send WRITE_CHECKPOINT messages to the nodes involved in the checkpoint, specifying the checkpoint transaction ID and the temporary location where the files should be placed in the shared repository. The nodes can index through the specified transaction ID, perform the copy and reply with FAILED_CHECKPOINT (on failure), WRITING_CHECKPOINT (periodically emitted during what will be a lengthy copy operation), or FINISHED_CHECKPOINT (on success) messages. Upon responding, the participant nodes can resume incorporating index requests.

If all nodes report FINISHED_CHECKPOINT, the coordinator can validate the contents of the checkpoint directory. If the checkpoint appears valid, then the coordinator can make the current checkpoint the last-known-good one by writing it to the checkpoint.files file in the shared repository and remove the oldest existing checkpoint past the number we've been requested to retain. The coordinator can proceed to re-read the old index queue files predating the checkpoint and delete any delta files mentioned therein. Finally, the old index queue files can be deleted.

The result of these operations can be an internally consistent set of archives in the checkpoint directory that represent the results of indexing through the transaction ID checkpoint. No delta files or index queues need to be included with the checkpoint data.

Errors can occur at several points during the checkpoint creation process. These errors can be reported to the user in a clear and prominent manner. In one embodiment, the checkpoint directory in the shared cluster home will only contain valid checkpoints. In one embodiment, errors should not result in partial or invalid checkpoints being left behind.

If checkpoints repeatedly fail, the index queue and delta files can accumulate until disk space in the shared repository is exhausted. A configurable search server parameter can put the cluster into read-only mode when the number of index queue segments exceeds some value.

Once the checkpoint problems have been resolved, and a checkpoint successfully completed, the number of index queue segments will shrink below this value and the cluster nodes can return to full read-write mode.

The search server API and the administrative utilities can provide the ability to query the cluster about checkpoint status. The response can include the status of the current checkpoint operation, if any and historical information about previous checkpoint operations, if such information is available in memory. A persistent log of checkpoint operations can be available through the cluster log.

It should be possible for a checkpoint operation to be interrupted by an external process (e.g., the command line admin utility) if an administrator issued the checkpoint request in error, or otherwise wishes to stop the operation.

Receipt of the "checkpoint abort" command (an addition to the queried grammar) by the checkpoint coordinator can cause it to abort any currently executing checkpoint operation. The "checkpoint abort" command can return its response once all participants have acknowledged that they are aborting their respective operations.

As a given customer's searchable corpus grows, they may wish to add additional nodes to the cluster for additional capacity and higher search performance.

Documents in a cluster can be partitioned based on a hash code derived from the document key, modulo the number of cluster partitions. Adding a partition to the cluster can require redistributing of potentially hundreds of thousands of documents, and thus represents a significant administrative undertaking requiring use of a dedicated repartitioning utility.

It is anticipated that adding or removing partitions from a search cluster can be a relatively rare occurrence. Adding or removing failover capacity to an existing cluster should be more frequent, and is thus designed to be a trivial administrative operation.

The administrator can use the cluster admin utility to initiate a repartitioning operation. As part of this, he can be required to enter the desired topology for the search cluster. This can include more or fewer partitions. In perverse cases, it might simply assign existing partitions to different physical nodes of the cluster.

The operator can also specify whether a checkpoint operation should be performed as part of the repartitioning. Since the repartitioning operation is based on the last-known-good checkpoint, this can probably default to "yes" to avoid excessive amounts of data replay in the nodes.

The utility can compare the specified topology against the current topology and decide how (or if) the cluster needs to be modified. No-op repartitioning requests can be rejected. A repartition request can fail if any of the nodes of the new topology is not online. Serialization can be enforced on repartitioning (only one repartition operation at a time).

Any nodes that have been removed from the cluster in the new topology can be placed in standby mode.

This process can be time-consuming for large collections. The administrative utility can provide ongoing feedback about its operations and, ideally, a percent-done metric.

Reloading a cluster node following repartitioning, can follow the same sequence of steps as node startup. Each node can obtain a checkpoint read lock and determines whether the current checkpoint topology matches its most recently used state. If not, then checkpoint reload is required. If the node's locally committed transaction ID is behind the Transaction ID associated with the current cluster checkpoint, then checkpoint reload can be done. Otherwise, it's safe to release the checkpoint read lock and start up with the existing local data.

When checkpoint reload is done, the binary archive files, lexicon and mapping data can be copied to local storage from the last-known-good checkpoint (which will use the new number of partitions post-repartitioning), the local Transaction ID can be reset to the Transaction ID associated with the checkpoint, the checkpoint read lock is released, and the node can start replay index request records from the shared data repository (subject to Transaction ID feedback to keep it from running too far ahead of the other active cluster nodes).

There are a number of failure modes that may occur during repartitioning. Failures may occur in any of the cluster nodes or in the administrative utility driving the repartitioning operation. In one embodiment, any failure which prevents a complete repartitioning of the cluster should leave the cluster in its previous topology, with its last good checkpoint intact. Failures should never leave the system in a state that interferes with future operations, including new checkpoint creation and repartitioning operations.

System administrators charged with managing a cluster can find it challenging to work with search server processes running on multiple machines. To the extent possible, administrative operations need not require manual intervention by an administrator on each cluster node. Instead, a central admin utility can communicate with cluster nodes to perform the necessary operations. This can help ensure system integrity by reducing the chance of operator error. The admin utility can also serve as a convenient tool with which to monitor the state of the cluster, either directly from the command prompt, or as part of a more sophisticated script.

Since individual nodes can be responsible for performing the administrative operations, the admin utility can serve primarily as a sender of search server commands and receiver of the corresponding responses. A significant exception to this is collection repartitioning, during which the admin utility can actively process search collection information stored in the shared repository. The utility can access to the cluster description files stored in the shared repository, in order to identify and communicate with the cluster nodes.

Most common subset of administrative operations can be available in the Administrative user interface (UI) as well. The set of administrative operations available through the command line can expose administrative functionality of the server. Some of these operations would generally not be suitable for customers, and should be hidden or made less prominent in the documentation and usage description.

Starting individual search nodes can require that the appropriate search software be installed on the hardware and configured to use a particular port number, node name and shared cluster directory. This can be handled by the search server installer. On Windows hardware, the search server can be installed as a service (presumably set to auto-start). On UNIX hardware, the search server can be installed with an associated inittab entry to allow it to start automatically on system boot (and potentially following a crash).

As the nodes start up, if they find an entry for themselves in a cluster.nodes file, they can validate their local configuration against the cluster configuration and initiate any necessary checkpoint recovery operations. The nodes can then transition to run mode. If the node does not find an entry for itself in the cluster.nodes topology file, then the node can enter standby mode and await requests from the command line admin utility. Once the cluster nodes are up and running, they can be reconfigured and incorporated into the cluster.

One embodiment may be implemented using a conventional general purpose of a specialized digital computer or microprocessor(s) programmed according to the teachings of the present disclosure, as will be apparent to those skilled in the computer art. Appropriate software coding can readily be prepared by skilled programmers based on the teachings of the present discloser, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

One embodiment may be implemented using a conventional general purpose of a specialized digital computer or microprocessor(s) programmed according to the teachings of the present disclosure, as will be apparent to those skilled in the computer art. Appropriate software coding can readily be prepared by skilled programmers based on the teachings of the present discloser, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media), the present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments where chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A distributed search system executed by a processor comprising:
    a group of storage nodes assigned to a plurality of different partitions, each partition comprising one or more nodes, each partition storing a different subset of document based records from a set of documents distributed across the plurality of different partitions, each node of each partition storing an index for the subset of documents stored in that partition, wherein:
        each of the storage nodes in the same partition independently process the document-based records to construct the indexes,
        each of the storage nodes is adapted to perform a repartition to change a number of partitions in the plurality of partitions or a number of storage nodes in one or more partitions of the plurality of partitions by processing a stored checkpoint in a central queue of document based records to be processed by the nodes of one or more of the partitions to produce a repartitioned checkpoint,
        the stored checkpoint and the repartitioned checkpoint each include index and document data for documents stored in the storage nodes and a synchronized lexicon of decoding information for each of the partitions, wherein each node maintains the decoding information of the synchronized lexicon for each partition, wherein each node decodes combined query results based on the decoding information of the synchronized lexicon of the partitions in which the combined query results are stored, and
        the group of storage nodes responds to search and index update requests during the construction of the repartitioned checkpoint, and
        the repartitioned checkpoint is loaded into the group of storage nodes to dynamically repartition the group of storage nodes.

2. The distributed search system of claim 1, wherein the repartition changes the number of partitions.

3. The distributed search system of claim 1, wherein the construction of the repartitioned checkpoint is done using the checkpoint.

4. The distributed search system of claim 1, wherein the checkpoint is created before the repartition.

5. The distributed search system of claim 1, wherein the repartitioned checkpoint is stored to back up the system.

6. The distributed search system of claim 1, wherein topology information is updated when the repartitioned checkpoint is loaded.

7. The distributed search system of claim 1, wherein the repartitioned checkpoint also includes partial data for the storage nodes of the different partitions.

8. The system of claim 1, wherein the group of storage nodes responds to search and update requests during the construction of the repartitioned checkpoint.

9. A non-transitory computer readable medium having stored thereon a series of instructions which, when executed by a processor, cause the processor to perform a repartition in a distributed search system by:
    assigning a group of storage nodes to a plurality of different partitions, each partition comprising one or more nodes, each partition storing a different subset of document based records from a set of documents distributed across the plurality of different partitions, each node of each partition storing an index for the subset of documents stored in that partition, wherein each of the storage nodes in the same partition independently process the document-based records to construct the indexes, and wherein each of the storage nodes is adapted to perform a repartition to change a number of partitions in the plurality of partitions or a number of storage nodes in one or more partitions of the plurality of partitions;

performing a reparation by one of the storage nodes by processing a stored checkpoint in a central queue of document based records to be processed by the nodes of one or more of the partitions to produce a repartitioned checkpoint, wherein the stored checkpoint and the repartitioned checkpoint each include index and document data for documents stored in the storage nodes and a synchronized lexicon of decoding information for each of the partitions, wherein each node maintains the decoding information of the synchronized lexicon for each partition, wherein each node decodes combined query results based on the decoding information of the synchronized lexicon of the partitions in which the combined query results are stored, and wherein the group of storage nodes responds to search and index update requests during the construction of the repartitioned checkpoint, and wherein the repartitioned checkpoint is loaded into the group of storage nodes to dynamically repartition the group of storage nodes; and loading the repartitioned checkpoint into a group of storage nodes to dynamically repartition the groups of storage nodes.

10. The computer readable medium of claim 9, wherein the repartition changes the number of partitions.

11. The computer readable medium of claim 9, wherein the construction of the repartitioned checkpoint is done using the checkpoint.

12. The computer readable medium of claim 9, wherein the checkpoint is created before the repartition.

13. The computer readable medium of claim 9, wherein the repartitioned checkpoint is saved to be available to back up the system.

14. The computer readable medium of claim 9, wherein topology information is updated when the repartitioned checkpoint is loaded.

15. The computer readable medium of claim 9, wherein the repartitioned checkpoint also includes partial data for the storage nodes of the different partitions.

16. A method for performing a repartition of a distributed search system, the method comprising:

assigning a group of storage nodes to a plurality of different partitions, each partition comprising one or more nodes, each partition storing a different subset of document based records from a set of documents distributed across the plurality of different partitions, each node of each partition storing an index for the subset of documents stored in that partition, wherein each of the storage nodes in the same partition independently process the document-based records to construct the indexes, and wherein each of the storage nodes is adapted to perform a repartition to change a number of partitions in the plurality of partitions or a number of storage nodes in one or more partitions of the plurality of partitions;

performing a reparation by one of the storage nodes by processing a stored checkpoint in a central queue of document based records to be processed by the nodes of one or more of the partitions to produce a repartitioned checkpoint, wherein the stored checkpoint and the repartitioned checkpoint each include index and document data for documents stored in the storage nodes and a synchronized lexicon of decoding information for each of the partitions, wherein each node maintains the decoding information of the synchronized lexicon for each partition, wherein each node decodes combined query results based on the decoding information of the synchronized lexicon of the partitions in which the combined query results are stored, and wherein the group of storage nodes responds to search and index update requests during the construction of the repartitioned checkpoint, and wherein the repartitioned checkpoint is loaded into the group of storage nodes to dynamically repartition the group of storage nodes; and loading the repartitioned checkpoint into a group of storage nodes to dynamically repartition the groups of storage nodes.

17. The method of claim 16, wherein the repartition changes the number of partitions.

18. The method of claim 16, wherein the construction of the repartitioned checkpoint is done using the checkpoint.

19. The method of claim 16, wherein the checkpoint is created before the repartition.

20. The method of claim 16, wherein the repartitioned checkpoint is stored to back up the system.

21. The method of claim 16, wherein topology information is updated when the repartitioned checkpoint is loaded.

22. The method of claim 16, wherein the repartitioned checkpoint also includes partial data for the storage nodes of the different partitions.

* * * * *

UNITED STATES PATENT AND TRADEMARK OFFICE
CERTIFICATE OF CORRECTION

| | | |
|---|---|---|
| PATENT NO. | : 9,015,197 B2 | Page 1 of 1 |
| APPLICATION NO. | : 11/832386 | |
| DATED | : April 21, 2015 | |
| INVENTOR(S) | : Richards et al. | |

It is certified that error appears in the above-identified patent and that said Letters Patent is hereby corrected as shown below:

In the drawings,

Drawing sheet 2 of 9, in figure 2, line 16, delete "recieve" and insert -- receive --, therefor.

Drawing sheet 3 of 9, in figure 3, line 6, delete "partion," and insert -- partition, --, therefor.

Drawing sheet 6 of 9, in figure 6, line 2, delete "recieve" and insert -- receive --, therefor.

Drawing sheet 8 of 9, in figure 8, line 4, delete "repatitioned" and insert -- repartitioned --, therefor.

In the claims,

Column 15, line 1, Claim 9, delete "document- based" and insert -- document-based --, therefor.

Column 15, line 6, Claim 9, delete "reparation" and insert -- repartition --, therefor.

Column 16, line 12, Claim 16, delete "reparation" and insert -- repartition --, therefor.

Signed and Sealed this
Ninth Day of February, 2016

Michelle K. Lee
*Director of the United States Patent and Trademark Office*